(12) United States Patent
Cahn

(10) Patent No.: US 7,263,065 B1
(45) Date of Patent: Aug. 28, 2007

(54) NETWORK HAVING MULTIPLE QOS LEVELS

(75) Inventor: Robert Cahn, Carmel, NY (US)

(73) Assignee: AT&T Corp., New York, NY (US)

( * ) Notice: Subject to any disclaimer, the term of this patent is extended or adjusted under 35 U.S.C. 154(b) by 1093 days.

(21) Appl. No.: 10/232,208

(22) Filed: Aug. 30, 2002

(51) Int. Cl.
*H04L 12/26* (2006.01)

(52) U.S. Cl. .................. 370/235; 370/255; 370/412

(58) Field of Classification Search ............... 370/235, 370/255, 412, 415
See application file for complete search history.

(56) References Cited

U.S. PATENT DOCUMENTS

| | | | |
|---|---|---|---|
| 5,231,633 A | 7/1993 | Hluchyj et al. | |
| 6,038,217 A | 3/2000 | Lyles | |
| 6,064,651 A | 5/2000 | Rogers et al. | |
| 6,064,677 A | 5/2000 | Kappler et al. | |
| 6,167,445 A | 12/2000 | Gai et al. | |
| 6,240,463 B1 | 5/2001 | Benmohamed et al. | |
| 6,272,131 B1 | 8/2001 | Ofek | |
| 6,286,052 B1 | 9/2001 | McCloghrie et al. | |
| 6,377,546 B1 | 4/2002 | Guerin et al. | |
| 6,377,583 B1 | 4/2002 | Lyles et al. | |
| 6,385,169 B1 | 5/2002 | Wang | |
| 6,389,031 B1 | 5/2002 | Chao et al. | |
| 6,404,735 B1 | 6/2002 | Beshai et al. | |
| 6,459,682 B1 * | 10/2002 | Ellesson et al. ............. | 370/235 |
| 6,822,940 B1 * | 11/2004 | Zavalkovsky et al. ...... | 370/237 |
| 6,990,113 B1 * | 1/2006 | Wang et al. ................ | 370/412 |
| 7,012,919 B1 * | 3/2006 | So et al. ..................... | 370/392 |
| 2002/0002636 A1 | 1/2002 | Vange et al. | |

FOREIGN PATENT DOCUMENTS

| | | |
|---|---|---|
| WO | WO 00/28705 | 5/2000 |
| WO | WO 00/60808 | 10/2000 |
| WO | WO 01/28169 | 4/2001 |
| WO | WO 02/25988 | 3/2002 |
| WO | WO 02/32052 | 4/2002 |

* cited by examiner

*Primary Examiner*—Hassan Kizou
*Assistant Examiner*—Jay P. Patel

(57) ABSTRACT

In a multi-QoS network, a scheduling mechanism, such as Weighted Fair Queueing, is configured to meet the multiple QoS guarantees. For each link with n classes and n fixed weights, the traffic is assigned to the various classes to meet end-to-end delay constraints.

9 Claims, 9 Drawing Sheets

NETWORK HAVING MULTIPLE QOS LEVELS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication networks and, more particularly, to communication networks having multiple quality of service (QoS) levels.

BACKGROUND OF THE INVENTION

Networks for interconnecting nodes with telecommunication links are well known in the art. Service providers typically have a private network that interfaces with other networks, such as the Internet, for enabling users to communicate with other users and resources. Service providers can agree to provide a specified level of service to users that guarantees a certain Quality of Service (QoS), which is typically defined in terms of delay or throughput. While providing a single QoS to one or more users by a service provider is well known, it would be desirable to efficiently provide multiple QoS levels.

SUMMARY OF THE INVENTION

The present invention provides a network having multiple QoS levels. The network includes a plurality of nodes interconnected by a series of links to which traffic in the network is assigned. The nodes have scheduling mechanisms, such as Weighted Fair Queueing, with queues having differing weights to provide the differing QoS levels. When QoS levels are not met, traffic can be re-assigned to a different class/priority on a link-by-link basis to meet the QoS levels. With this arrangement, multiple QoS levels in a network can be efficiently provided. While the invention is primarily shown and described in conjunction with various network topologies and scheduling mechanisms, it is understood that the invention is applicable to networks in general in which QoS levels should be satisfied.

In one aspect of the invention, multiple QoS levels in a network are provided by determining a topology of the network and a number of queues for the network nodes. For each of the queues, weights are assigned for the scheduling mechanism, such as Weighted Fair Queueing (WFQ) to provide differing priorities for respective classes of traffic. Network traffic is then assigned to the queues on a link-by-link basis and it is determined whether QoS requirements are met. If not, a portion of traffic on one or more links can be re-assigned to a higher priority class to meet the QoS requirements.

In another aspect of the invention, traffic can be re-assigned based upon a plot of arrival rates for the respective queues. Delays can be established for each grid value. The grid can be used to re-assign traffic into the next higher class by using a grid point to the north and east of the resulting flow.

BRIEF DESCRIPTION OF THE DRAWINGS

The invention will be more fully understood from the following detailed description taken in conjunction with the accompanying drawings, in which.

DETAILED DESCRIPTION OF THE INVENTION

In general, the present invention relates to networks having multiple Quality of Service (QoS) levels. As is well known in the art, the QoS metric is delay. For example, a network provider can offer customers 400 millisecond (ms) end-to-end delay for low priority traffic, 200 ms delay for medium priority traffic and 100 ms delay for high priority traffic. Each link in the fixed network schedules traffic according to a service discipline. Exemplary scheduling mechanisms include first-come, first-served (FCFS), priority queueing (PQ) and weighted fair queueing (WFQ). Without limitation thereto, the invention is primarily shown and described in exemplary embodiments utilizing WFQ. As described in detail below, WFQ can be configured so as to meet specified QoS guarantees. More particularly, the invention provides a method for assigning traffic to classes to meet end-to-end delay constraints for networks in which each link has n fixed number of classes with n fixed, predetermined, weights.

Figure 1:
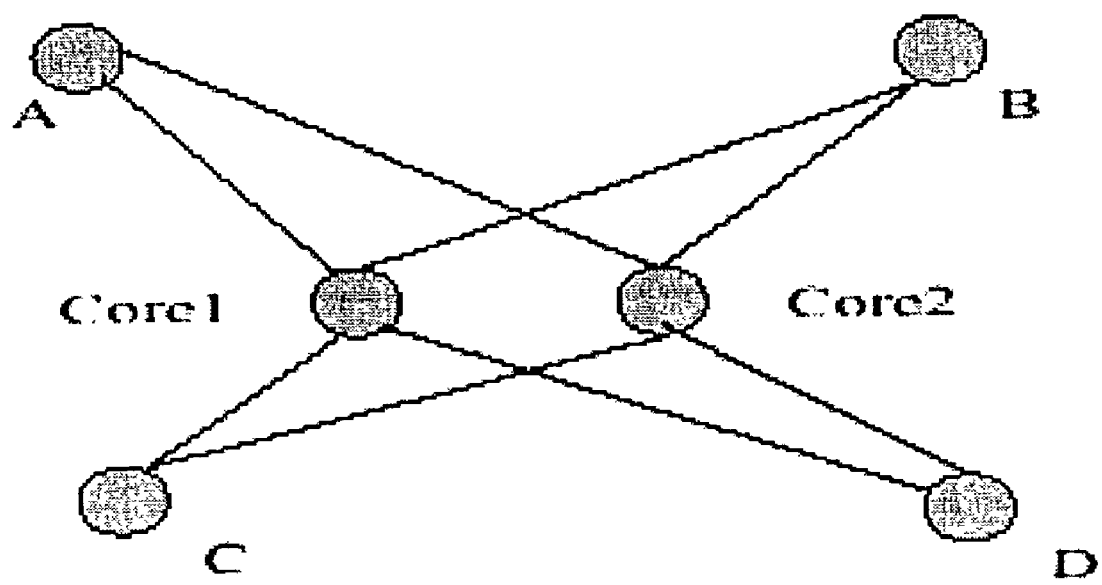
FIG. 1 is a schematic depiction of a multi-QoS network having traffic re-assignment in accordance with the present invention.

Before describing the invention, some introductory concepts are discussed below. FIG. 1 shows an exemplary two-hop switch complex having first and second cores and a series of nodes A-D interconnected via the cores. When a network provides a single quality of service, the engineering of the network is relatively straightforward. This applies to both blocking and delay constraints. For example, a network can be constrained by determining: "What is the least cost network in which the average end-to-end delay is below 300 ms?" or "What is the least cost system where the system-wide blocking is below 0.1%?" One of ordinary skill in the art can attempt to find a solution for such a single QoS constraint using known techniques.

Multi-QoS system constraints pose additional challenges. The problem can be defined as follows: For a fixed given set of sites, V, and a set of candidate links, and QoS traffic matrices $T_1, T_2, \ldots, T_k$, and delay constraints $UB_1$, $UB_2, \ldots, UB_k$, find the minimum cost network, G, with routing weights $rw_e$ and WFQ weights $w_i$ such that the delay for traffic of class i, $T_i < UB_j$. One of ordinary skill in the art will readily recognize that such a problem entails a number of challenges. For example, topology design involves selecting the links to interconnect the nodes. There are a number of well-known algorithms that can be utilized to address topology considerations including the so-called MENTOR algorithm and its derivatives. Routing considerations include setting the routing weights to achieve the optimal data flow. Various so-called "balancing" algorithms that are known to one of ordinary skill in the art can be used. In addition, weight selection for the scheduling mechanism includes determining how many logical queues should share the physical queue and what weight should be assigned to each logical queue. And traffic assignment considerations include, after selecting parameters for topology, routing, and weight selection, optimally assigning traffic to the logical queues.

A conventional, single QoS, undifferentiated service can be provided by First-Come, First-Served (FCFS) queueing, for example. The behavior of these systems is typically modeled as so-called M/M/1 systems or M/G/1 systems. As is well known in the art, in either case there are closed-form, analytic solutions for the queueing delay and thus for the total link delay. These often-used techniques are used to engineer trunks in packet-switched networks. For example, a provider can agree to deliver services subject to a 200 ms delay constraint. A network can then be designed with the constraints shown in Table 1 below.

TABLE 1

| Max hops | Delay/hop |
|----------|-----------|
| 3        | 33.3 ms   |
| 4        | 25 ms     |
| 5        | 20 ms     |
| 6        | 16.6 ms   |
| 7        | 14.3 ms   |

The methodology for solving each of these problems is relatively straightforward. First, a number of designs are generated that obey the hop constraint. Two approaches to generating the designs include so-called culling and augmentation, which are well known to one of ordinary skill in the art. In general, culling is a technique in which a large number of networks are designed and only those keeping the hop constraints are kept. In augmentation, links are added to a well-designed network to lower the maximum hops to the desired value. For each design, a simplified capacity assignment algorithm is used to resize each link to fulfill the delay requirement. Finally, the cheapest or most attractive design of the suite of designs created is selected for use.

It will be readily apparent to one of ordinary skill in the art that the above procedures have significant limitations when designing a multi-QoS network. Suppose, for example, that links can be used to 65% of capacity and that a provider offers three types of service with 100 ms, 200 ms, and 300 ms end-to-end delays. Assume that 1200 byte packets are available. If the provider uses the link rates commonly available in North America (e.g., T1 and DS3), then the provider can compute the minimum link speed needed to satisfy the specified network delay, which is shown below in Table 2.

TABLE 2

| Max hops | Delay/hop | Min link speed |
|----------|-----------|----------------|
| 3        | 33.3 ms   | T1             |
| 4        | 25 ms     | T1             |
| 5        | 20 ms     | T1             |
| 6        | 16.6 ms   | T1             |
| 7        | 14.3 ms   | DS3            |

Note that the values are calculated so that $$\frac{T_s}{1-\rho}$$

is less than the indicated delay, and where $T_s$ is the average packet service time—i.e., the mean time it takes to transmit a packet on the link assuming no queueing—and $\rho$ is the utilization of the link. Also, $\rho = \lambda/\mu$, where $\lambda$ is the arrival rate and $\mu$ is the departure rate.

As can be seen, at seven hops DS3 level link speed is required independent of the amount of traffic to meet the delay requirement. Thus, if a network is to meet a 100 ms end-to-end delay, a priori it must be limited to six hops.

While six hops may initially appear generous, experience has shown that city sites, for example, rarely comprise a single box and that there is at least one, and often two, extra hops within a site to route from the ingress to the egress trunk. Consequently the six-hop constraint actually becomes a two-hop or a three-hop constraint in a wide area network. It will be appreciated that this constraint is relatively difficult to meet. In addition, the number of links in the network grows as $$\binom{n}{2}$$

switches or routers have to terminate a large number of trunks. Such an arrangement leads to meshy, low speed designs that can be expensive compared to designs using higher speed links.

Thus, while conventional routing techniques may be effective for a single QoS, such techniques have limited utility for multiple-QoS networks. For example, if a provider is trying to meet a single QoS constraint, an algorithm of the well-known "Bertsekis-Gallager" type can be used to move traffic from an overloaded link onto a less used link.

For example, in the triangular network 100 of FIG. 2, which has first, second, and third nodes A, B, C, the traffic characteristics can be as shown in Table 3 below:

TABLE 3

| Source | Dest | Volume       |
|--------|------|--------------|
| A      | B    | 8 × 100 Kbps |
| B      | C    | 3 × 100 Kbps |
| A      | C    | 4 × 100 Kbps |

If the links Lab, Lac, Lbc have a capacity of 1.0 Mbps and an M/M/1 model is assumed with average packet length of 10,000 bits, then the delay for the A to B traffic will be $5 \times T_S = 50$ ms. If the provider has contracted by Service Level Agreement (SLA) to deliver service with maximum end-to-end delay for these packets of 33 ms, then the service provided by the default routing will not be acceptable. It is possible to improve this situation if the provider routes some of the A to B traffic via C. Suppose a single session is moved, where session denotes one of the eight parallel 100 Kbps, A to B quantum of traffic and does not imply the use of connections. The resulting delays are shown below in Table 4:

TABLE 4

| Source | Dest | route | Volume | Delay |
|---|---|---|---|---|
| A | B | direct | 7 × 100 Kbps | 33.333 |
| A | B | A-C-B | 1 × 100 Kbps | 36.667 |
| B | C | direct | 3 × 100 Kbps | 16.667 |
| A | C | direct | 4 × 100 Kbps | 20 |

The average performance of the A to B traffic, $7/8 \times 33.333 + 1/8 \times 36.667 = 33.75$, slightly exceeding the SLA.

The SLA objectives can be achieved by moving 200 Kbps of traffic onto the indirect route, which is summarized in Table 5:

TABLE 5

| Source | Dest | route | Volume | Delay |
|---|---|---|---|---|
| A | B | direct | 6 × 100 Kbps | 25 |
| A | B | A-C-B | 2 × 100 Kbps | 45 |
| B | C | direct | 3 × 100 Kbps | 20 |
| A | C | direct | 4 × 100 Kbps | 25 |

The average performance of the A to B traffic, i.e., $6/8 \times 25 + 2/8 \times 45 = 30$, which meets the SLA.

It is understood that for the A to B traffic to meet the SLA, the packets must all belong to the same customer. If the 600 Kbps of traffic belongs to one customer and the 200 Kbps of traffic belongs to a second customer, then the second customer's traffic would not meet the advertised SLA.

In one aspect of the invention, queueing can be used to meet QoS constraints. Suppose that instead of meeting a single QoS constraint, a provider seeks to give preference to certain traffic. The previous problem can be modified by dividing the A-B traffic into two components with different performance SLAs as shown in Table 6:

TABLE 6

| Source | Dest | Volume | SLA |
|---|---|---|---|
| A | B | 5 × 100 Kbps | 50 ms |
| A | B | 3 × 100 Kbps | 25 ms |
| B | C | 3 × 100 Kbps | 50 ms |
| A | C | 4 × 100 Kbps | 50 ms |

It will be readily apparent for this particular example that routing considerations alone will be insufficient. For example, if the provider routes the 300 Kbps of A-B traffic directly and routes the 500 Kbps of A-B traffic via C, then the SLA for the high priority traffic is met but the SLA for the low priority traffic is not met, as shown in Table 7:

TABLE 7

| Source | Dest | Route | Volume | delay |
|---|---|---|---|---|
| A | B | direct | 3 × 100 Kbps | 14.28 ms |
| B | C | direct | 3 × 100 Kbps | 50. ms |
| A | C | direct | 4 × 100 Kbps | 100. ms |
| A | B | A-C-B | 5 × 100 Kbps | 150. ms |

In another aspect of the invention, a scheduling mechanism, such as Weighted Fair Queueing (WFQ), can be used to meet the SLA. This arrangement can avoid moving too much traffic onto a particular route.

WFQ is a queueing mechanism that gives preference to certain packets at the expense of others. WFQ is one of a family of processor scheduling protocols including Worst-Case Fair WFQ ($WF^2Q$), Weighted Round Robin (WRR) and Deficit Round Robin (DRR), each of which has the goal of attempting to share a transmission queue among a group of flows. It is understood, however, that the invention is not limited to WFQ or any particular mechanism.

Figure 2:
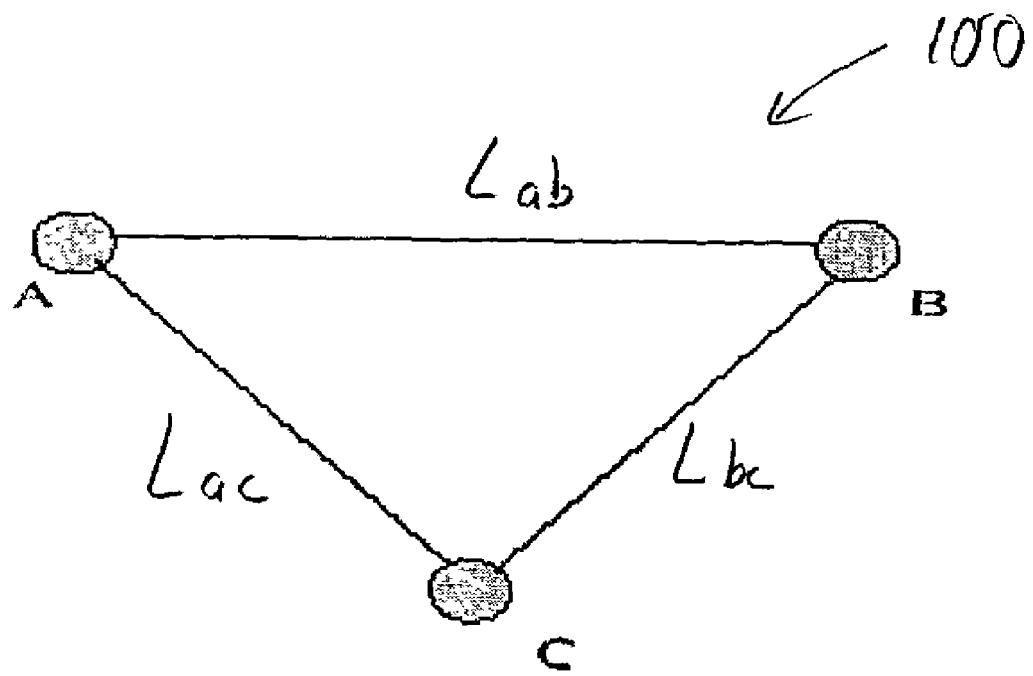
FIG. 2 is a schematic depiction of a triangular network that is useful for illustrating traffic re-assignment techniques in accordance with the present invention.

Referring again to the triangular network of FIG. 2, the effect of WFQ on satisfying the QoS constraints listed in Table 6 above can be examined. It was found that rerouting the 500 Kbps of traffic onto the alternate, 2-hop (A-B-C) route added an unacceptable amount of delay to the other two links. Instead of rerouting the alternate traffic, the high priority traffic can be given a weight of $W_{high}=0:75$, for example, and the remaining, low priority, traffic can be given a weight of $W_{low}=0:25$, for example.

As is known in the art, with WFQ a packet entering the queue may jump ahead of packets already in the queue. Also, subsequent packets may enter service before the packet just added to the queue. As a result, it becomes challenging to compute the waiting time when there are $n_1$ packets of class 1 in the queue and $n_2$ packets of class 2. The transition probabilities are similarly challenging.

Thus, in an exemplary embodiment a simulation is used to evaluate the inventive system. In one particular embodiment, the simulator has certain properties as follows. An infinite buffer is assumed so that the effects of buffer discard are not calculated and the handling of congestion by tail drop, random early discard (RED), or weighted RED (WRED) is not modeled. The packet lengths are assumed to be exponentially distributed in this example but can be modeled by other general distributions. Arrivals in the delay are inserted in increasing order of the scheduled departure time or scheduled finish time. If there is no packet of the class i in the queue when a packet arrives at time to, then the finish time is set to $F_j = t_0 + L/w_i$ where L refers to the packet length and $w_i$ refers to the weight for packets in class i. Otherwise the finish time is set to $F_j = F_{j-1} + L/w_1$ where $F_{j-1}$ is the finishing time of the previous packet of class i in the queue.

Figure 3:
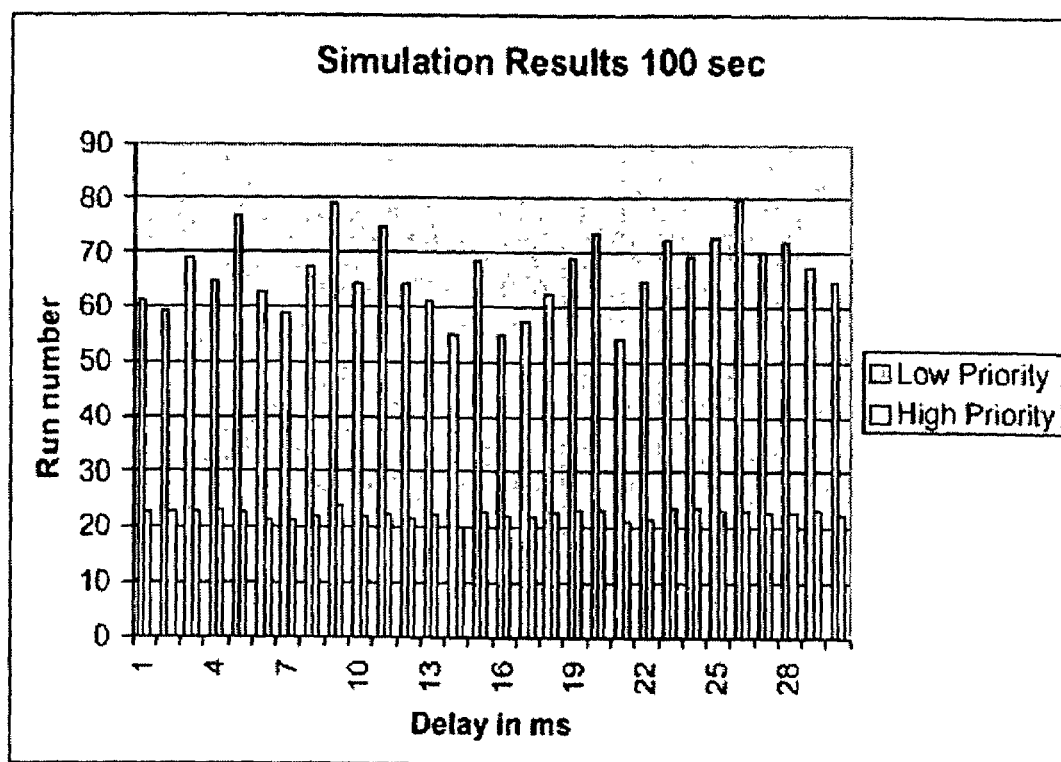
FIG. 3 is a graphical depiction of simulation results for an exemplary traffic re-assignment in accordance with the present invention.

FIG. 3, in combination with FIG. 2, shows simulation results when all the A-B traffic is directly routed from source to destination and the high priority traffic is given a weight $w_{hi}=0:75$ and the low priority traffic is given the weight $w_{lo}=0:25$.

It can then be seen that an approximation of the delay for the low priority traffic is the average of the delays, i.e., 66.3 ms, and the delay for the high priority traffic is approximately 22.5 ms. The high priority traffic achieves the SLA under this scheme and the low priority does not in this particular example. It will be appreciated that the low priority traffic would meet a slightly higher delay constraint.

Figure 4:
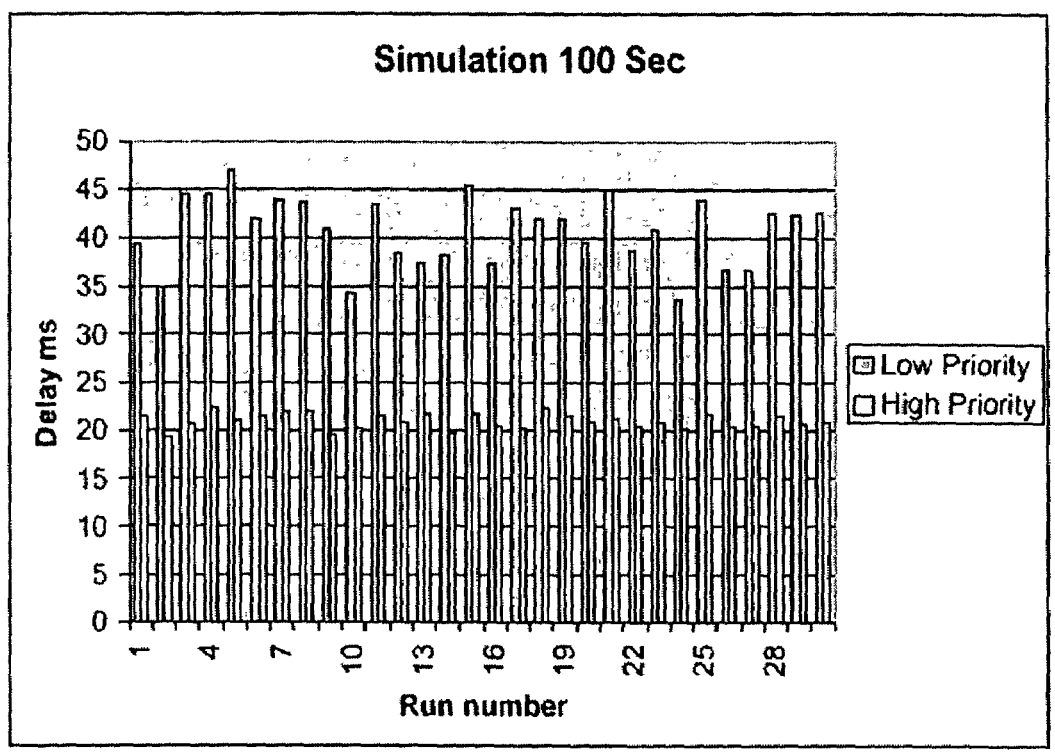
FIG. 4 is a further graphical depiction of simulation results for an exemplary traffic re-assignment in accordance with the present invention.

However, by moving some of the high priority, A-B traffic onto the 2-hop, A-C-B route, the desired SLA can be achieved. If 100 Kbps of low priority traffic is moved onto the 2-hop route, then the delays of the remaining traffic can be seen in FIG. 4. Table 8 below shows the delays when the low-priority A-B traffic is combined with the other traffic on the A-C and C-B links:

TABLE 8

| Source | Dest | route | priority | Volume | delay |
|---|---|---|---|---|---|
| A | B | direct | high | 3 × 100 Kbps | 20.96 ms |
| A | B | direct | low | 4 × 100 Kbps | 40.84 ms |
| B | C | direct | low | 3 × 100 Kbps | 16.66 ms |
| A | C | direct | low | 4 × 100 Kbps | 20. ms |
| A | B | A-C-B | low | 1 × 100 Kbps | 36.66 ms |
| A | B | average | low | 5 × 100 Kbps | 37.71 ms |

As described above, providing multiple QoS SLAs on a network can include placing traffic into a higher or lower WFQ class and/or moving some traffic from a congested to a less-congested alternate path. However, for any such class/path moves, it should be determined whether the overall performance has improved. It will be appreciated that WFQ changes can be challenging since adding traffic in any class to any link affects all the traffic on that link, not merely the lower priority traffic, as is clearly shown in FIGS. 3 and 4. For example, as described above, moving 100 Kbps of low priority traffic off the link improved the delays for both high priority and low priority traffic.

Figure 5:
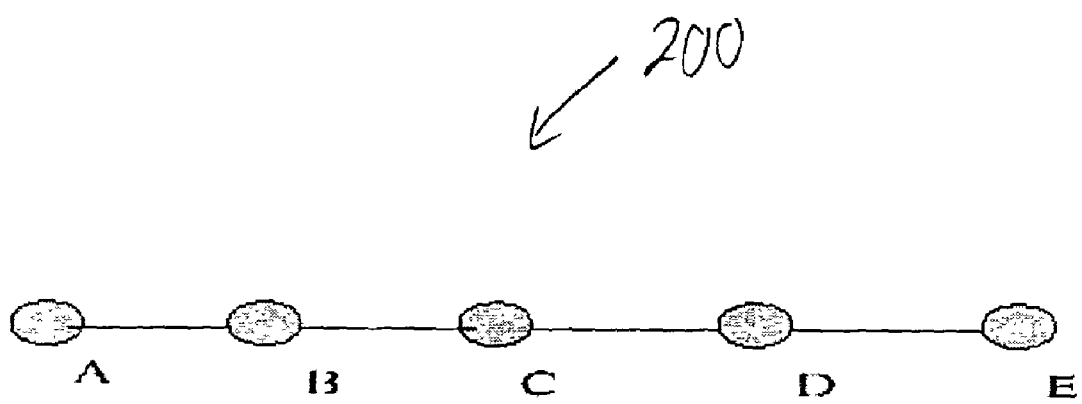
FIG. 5 is a schematic depiction of a further network that is useful for illustrating traffic re-assignment techniques in accordance with the present invention.

One consideration is to determine whether all the traffic carried by a network achieves the appropriate SLA, can the traffic be reassigned to lower WFQ classes and still achieve the SLA. This can be illustrated in a simple linear network 200 having nodes A-E shown in FIG. 5. Because the network 200 is a tree, there are no routing decisions and the problem of meeting the SLA becomes one of assigning each flow on each link to a queueing class and setting the weights. As before, it is assumed that there are two queues. Queue 1 has a first weight $w_1 = 3/4$ and queue 2 has a second weight $w_2 = 1/4$. It is assumed that, as before, there are 1 Mbps links and an average packet length of 10,000 bits giving $\mu=100$, where $\mu$ is the departure or service rate from the system. If the queue is full of packets with an average size of 10,000 bits, then the service rate will be 1,000,000/10,000=100 packets per second (pps). Assume uniform traffic between the nodes A-E with each piece of traffic being 125 Kbps. Then the total traffic crossing each link is shown in Table 9:

TABLE 9

| End$_1$ | End$_2$ | Volume |
|---|---|---|
| A | B | 3 × 125 Kbps = 375 Kbps |
| B | C | 6 × 125 Kbps = 750 Kbps |
| C | D | 3 × 125 Kbps = 375 Kbps |

It is relatively straightforward to compute the average performance, e.g., 42.667 ms, of a system without WFQ. Referring to the results shown in Table 10, it can be seen that the delay of the A to B and C to D traffic requires crossing only one link that has $\rho=0.375$. Since the delay is $T_S/(1-\rho)$, it can be seen that the delay is approximately 16 ms. The calculations for the rest of the traffic are shown below in Table 10:

TABLE 10

| Traffic | Delay |
|---|---|
| A to B and C to D | 16 ms |
| B to C | 40 ms |
| A to C and B to D | 56 ms |
| A to D | 72 ms |

Now assuming that 30 kbps of each 125 Kbps is high priority with an SLA of 50 ms and that the rest of the traffic has an SLA of 100 ms, the goal is to achieve these objectives using WFQ. It is clear that the A-B and C-D traffic need not be in the high priority queue. It is also clear that all of the A-D traffic needs to be in the high priority queue in at least one link.

An exemplary greedy algorithm can now be run as follows:
Assign all traffic to the lowest WFQ class.
If all traffic meets SLA return TRUE.
Loop forever. //Not a real infinite loop
    Find the traffic requirement, R, that most exceeds the SLA and not considered. Loop over the links in the path.
    Improved=FALSE.
        Compute the result of moving R into the next higher WFQ class.
        If promoting R causes any previously satisfied piece of traffic to no longer be satisfied reject and continue.
        Reset the WFQ for R on the link that most improves the progress toward the SLA and break from the inner loop. Improved=TRUE. Break to outer loop.
    If all traffic meets SLA return TRUE.
    If improved==FALSE return FALSE.

In the inner loop, the algorithm evaluates the effect of promotion of the traffic from the low priority to the high priority queue. For example, looking at the A-B or C-D link, there are only a few possibilities to consider as shown in Table 11:

TABLE 11

The delays on the A-B or C-D link based on simulation

| Traffic | Delay High | Delay Low |
|---|---|---|
| 375 low 0 high | * | 16 ms |
| 345 low 30 high | 13.80 | 16.07 |
| 315 low 60 high | 14.19 | 16.33 |
| 285 low 90 high | 14.08 | 16.29 |

The table is not exhaustive for the following reasons. The first row is the case when all of the traffic is assigned the lower WFQ class. The second row covers the case when one of the high priority streams has been moved to the high priority class and all other traffic, both high and low priority, stays as low priority traffic on the A-B link.

The numbers show that promoting traffic to the higher WFQ class on the lightly loaded links cannot significantly reduce the delay of the high priority traffic. The reason is clear in view of the buffer occupancy. While a given high priority packet may "jump the queue" and receive preferential treatment, a M/M/1 type system with $\rho=0.35$ is lightly loaded. The classical analysis of this system shows that if the probability of the system containing i packets is $p_i$, then $p_i=(1-\rho)\times\rho^i$. Thus the probability that the system is empty is 0.65 and the probability that there is one packet in the system is 0.2275. The probability that there are two packets in the system is $0.65*(0.35)^2=0.0796$ and the probability of three packets is 0.0279. If the system arrives in a second state $S_2$ from a first state $S_1$, then the packet that was in service continues in service since the system is non-preemptive. The first time that the system gives an advantage to high priority packets is in third state S3 and that state has a very low probability. Thus, the 2 ms preference to the high priority traffic is reasonable since it involves states that have a very low probability.

The results shown in Table 12 show the effect of moving traffic into the preferred queueing class on that link:

TABLE 12

The delays on the B-C link based on simulation.

| Traffic | Delay High | Delay Low |
|---|---|---|
| 750 low 0 high | * | 40 ms |
| 720 low 30 high | 17.47 | 40.04 |
| 690 low 60 high | 17.93 | 41.68 |
| 660 low 90 high | 18.42 | 42.35 |

In view of the problem set forth above, if WFQ is to have the desired effect, then it should be applied to the traffic transiting the B-C link. The results in Tables 11 and 12 above make the operations of the algorithm clear. All of the low priority traffic is within specification while only the one-hop high priority traffic meets its SLA. The algorithm proceeds as described below.

The "worst" traffic is the A to D traffic. Examining the three links finds that the biggest improvement is by moving 30 K of traffic to the preferred queueing class on the B-C link. The low priority traffic is the only traffic currently meeting its SLA and it still meets the SLA afterwards. The delay for the A to D traffic is now 32 ms+17.47 ms=49.47 ms and it goes in specification.

The A-C traffic and B-D traffic are both out of specification with the same delay so the algorithm chooses one at random, say A-C. The algorithm now reviews the two possible links and uses preferred queueing on the B-C link. The A-D traffic will have a 49.93 ms delay, which is still acceptable. The A-C traffic will have a delay of 16 ms+17.93 ms=33.93 ms.

The traffic on the B-D link can be considered last. If this traffic is added to the center link, the delay of the A-D traffic goes over the limit to 50.42 ms. Thus, that link is not used. If the C-D link is used, it is found that the delay for the B-D traffic is 13.80+41.68=55.48 ms and the algorithm may terminate in failure.

In this particular example, the SLA was almost met but there was an inability to give sufficient preference to the high priority traffic. It is understood that in other embodiments the SLAs could be met with the actions described above.

In another aspect of the invention, further actions can be taken to facilitate meeting the SLAs, including one or more of changing the WFQ weights, changing the SLA, changing the topology, and creating a better model of the traffic packet length distributions.

The WFQ weights can be changed for improved scheduling. The computed delays were a function of the specific choices for $w_1$ and $w_2$. Suppose instead of using weights of ¾ and ¼ respectively, the high priority traffic is given a greater advantage by choosing $w_1=9/10$ and $w_2=1/10$. Not much change would be expected on the two outer links since the buffer occupancy is unchanged but the effect on the inner link is significant. The results are shown in Table 13:

TABLE 13

The delays on the B-C link with $w_1 = 9/10$ based on simulation.

| Traffic | Delay High | Delay Low |
|---|---|---|
| 750 Low 0 high | * | 40 ms |
| 720 low 30 high | 17.86 | 40.92 |
| 690 low 60 high | 17.87 | 41.38 |
| 660 low 90 high | 18.31 | 43.16 |

The simulation results in Table 13 show either a slight improvement or decrease in the performance of the high priority traffic. A cursory review of the results indicate that the average traffic will wait slightly longer than ⅔ of a packet service time of 10 ms before entering service. Of that ⅔ there is ½ a service time waiting for the packet in queue to terminate and a further delay of about ⅙ that can be attributed to queueing for other high priority traffic and other factors. In this case it can be seen that changing the WFQ weights is unlikely to give the requisite performance. It is understood, however, that modifying the WFQ weights may give the desired performance improvement for different SLAs.

In a further aspect of the invention, the SLA can be modified. In the above example, a less aggressive SLA could have been met. The SLA can be changed to increase the SLA objectives for all traffic and/or increase the SLA objectives for some traffic. The greedy algorithm set forth above would have had no difficulty if the SLA for the high priority traffic was 75 ms or even 66 ms. In accordance with the present invention, the SLA can be set to a level for which it can comfortably be met.

Alternatively, there can be different SLAs for some of the traffic. The greedy algorithm can be used to offer guidance. Taking the traffic that is initially the most out of compliance may promote the wrong traffic to a higher SLA. For example, suppose that traffic $T_{R,S}$ is out of SLA compliance by 40 ms and traverses three links. Suppose that on each link, promoting it to a higher priority can buy 15 ms. On the other hand, $T_{X,Y}$ is out of compliance by 30 ms and traverses two links. Suppose that promoting it on each link reduces the delay by 10 ms. It would be less than optimal to set a higher SLA objective for the R, S traffic rather than the X, Y traffic just because initially it is further from the delay objective. An exemplary algorithm to address this problem is set forth below:

If all traffic meets SLA stop.
Loop until done.
   Run the greedy WFQ assignment algorithm.
   Find the traffic requirement, R, that most exceeds the SLA upon failure of the greedy assignment algorithm.
   Increase the SLA goal by a factor of a for R, where α is a fixed constant greater than 1.

It is understood that α provides a step size to incrementally adjust the SLA to determine an optimal SLA for the network. That is, instead of trying to meet a somewhat arbitrarily chosen SLA, which can require large costs for nominal bandwidth gains, an SLA can be selected that "makes sense" based upon an existing network characteristic, such as topology. Using this algorithm, the SLA can be incrementally increased until it can be achieved with minimal network modifications.

In one particular embodiment, a rough step size a1 can be selected to determine an approximate optimal SLA and a fine step size α2 can be selected to further refine the approximate optimal SLA. With this arrangement, overall processing to arrive at an optimal SLA can be substantially reduced by deriving an approximate SLA relatively quickly.

In a further aspect of the invention, the network topology can be modified to achieve a given SLA. In one embodiment, the capacity assignment can be modified to add capacity to the existing links. In another embodiment, augmentation techniques can be used to add new links to the network.

In the case of the linear network shown in FIG. 3, capacity assignment can add capacity to the B-C link. If the capacity of the link is doubled to 2 Mbps, then the SLA is achieved with relative ease since the service time on the link is halved from 10 ms to 5 ms and the maximum utilization on any link is reduced to 37.5%. An exemplary algorithm for this approach is as follows:

If all traffic meets SLA stop.
Loop until done.
   Run the greedy WFQ assignment algorithm.
   Find the link L, that is traversed by the most requirements that fail to meet their SLA upon failure of the greedy assignment algorithm.
   Increase the capacity of link L to the next capacity.

In the inner loop, the greedy WFQ assignment algorithm should be changed to consider all the requirements that fail to meet their SLA and not terminate when a single requirement fails as in the previous algorithm above. In addition, there is an issue as to whether to count the traffic weighted by their traffic volumes or unweighted. In an exemplary embodiment, both techniques can be tried on any given problem.

In another aspect of the invention, a variety of traffic packet length distributions can be evaluated for SLA calculations. For example, the estimates for the SLA calculations above were based on simulations where the packet lengths were exponentially distributed. Suppose that instead of assuming exponential distribution, observation of the traffic reveals the packets are exactly 10 Kbs long, for example. If this behavior is modeled in the same way as exponential distribution, it can be seen that the per-link delays are quite different, as shown in Table 14:

TABLE 14

The delays on the B-C link with $w_1 = \frac{3}{4}$ and packet length 10 kb.

| Traffic | Delay High | Delay Low |
|---|---|---|
| 750 low 0 high | * | 16 ms |
| 720 low 30 high | 13.90 | 25.52 |
| 690 low 60 high | 13.97 | 26.09 |
| 660 low 90 high | 14.13 | 26.67 |

These results are quite different from the WQF-M/M/1 results derived earlier.

More realistic estimates can be obtained by using a simple point model where it is assumed that there are a finite number of packet lengths, $L_1, L_2, \ldots L_k$ and a set of probabilities of each length $p_1, p_2, \ldots, p_k$, $\Sigma p_i = 1$. Making an assumption that the length of each packet is uncorrelated with the previous packet, then the delays can be modeled per class as for M/M/1 and M/D/1 systems.

It is understood that in the inner loop of the above algorithms, changing the queueing class of a given piece of traffic is evaluated to determine whether the change makes the situation better or worse. For a single QoS class, the classic M/M/1 delay formula can be used:

$$\frac{T_s}{1-\rho}.$$

Similarly, M/D/1 or M/G/1 estimates can also be used. However, in the present case, there are multiple QoS classes.

Figure 6:
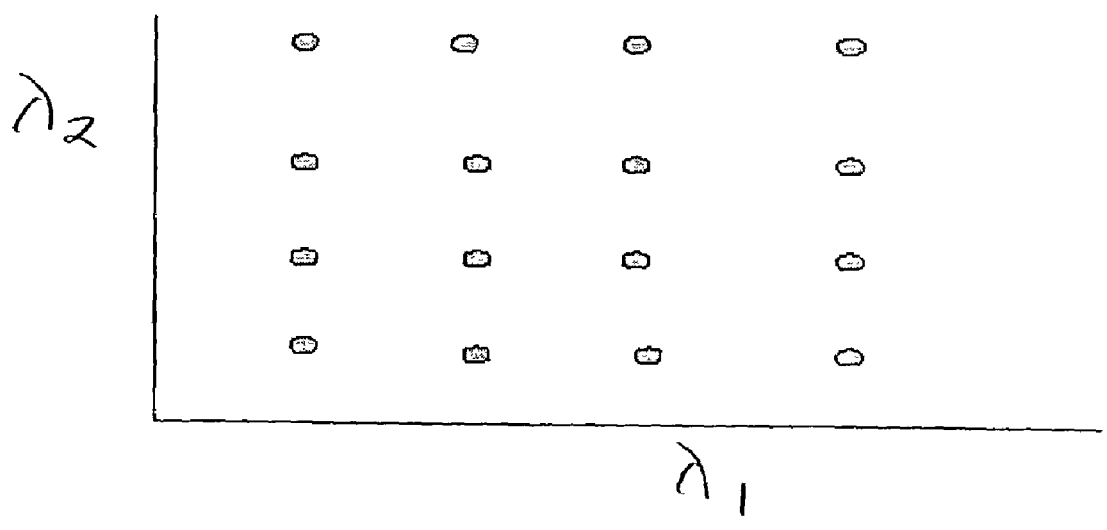
FIG. 6 is a graphical depiction of a first arrival rate versus a second arrival rate for a link that can be used for traffic re-assignment in accordance with the present invention.

An exemplary delay estimate discussed below includes the following assumption: In a WFQ system with given arrival rates $\lambda_1$ and $\lambda_2$ having known delays $d_1$, $d_2$ then if $\lambda_1' < \lambda_1$ and $\lambda_2' < \lambda_2$, the observed delays $d_1'$ and $d_2'$ will be bounded by $d_1$ and $d_2$. FIG. 6 shows a graphical depiction of a grid of values for the first and second arrival rates $\lambda_1$ and $\lambda_2$, where $\lambda_1$ and $\lambda_2$ respectively represent actual arrival rates.

The first and second delays $d_1$, $d_2$ can be established for the values in the grid, as described in detail below. The values of $d_1$ and $d_2$ for $(\lambda_1, \lambda_2)$ on the grid can be filled in. The original greedy algorithm can be modified to be as follows, where all traffic is initially assigned the lowest WFQ class:

If all traffic meets SLA stop.
Loop until done.
   Find the traffic requirement, R, that most exceeds the SLA.
      On each link the R traverses compute the result of moving the traffic into the next higher WFQ class by using the grid point to the north east of the resulting flow.
      If promoting R causes any previously satisfied piece of traffic to no longer be satisfied reset and continue.
      Reset the WFQ for R on the link that most improves the progress toward the SLA and break from the inner loop.
If all traffic meets SLA done=TRUE.

Figure 7:
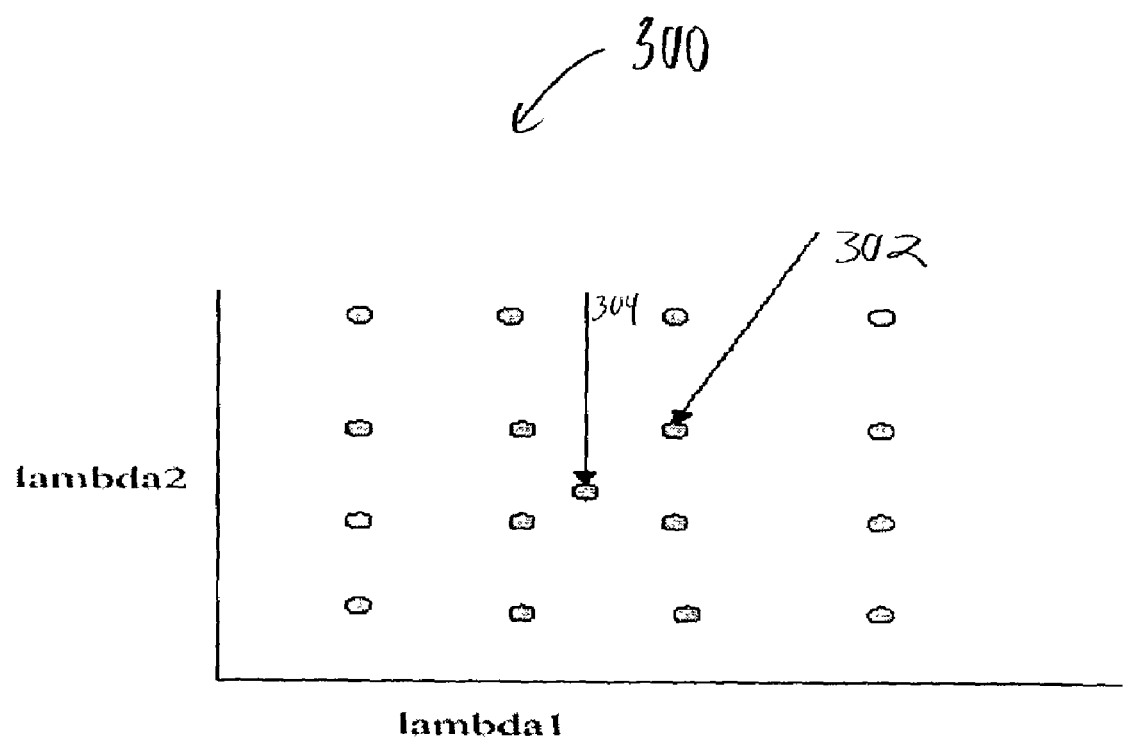
FIG. 7 is a further graphical depiction of a first arrival rate versus a second arrival rate for a link that can be used for traffic re-assignment in accordance with the present invention.

FIG. 7 shows an exemplary grid 300 having a North East grid point 302 and an actual λ 304. Recall that it is assumed that if the assumed arrival rates for both high and low priority traffic $(\lambda_1, \lambda_2)$ are higher than the actual arrival rates $(\lambda'_1, \lambda'_2)$, then the delays computed by simulation for $(\lambda_1, \lambda_2)$ will be relatively conservative estimates for the actual delays. The North East grid point 302 is the value of $(\lambda_1, \lambda_2)$ which is closest to $(\lambda'_1, \lambda'_2)$. While the grid 300 is drawn for two different queues, it is understood that the number of queues can be expanded to meet the needs of a particular application. This concept extends naturally to k different QoS. The difference is that the complexity of the off-line calculation increases from $n^2$ to $n^k$, where k represents the number of queues.

The first delay $d_i$ can be computed as follows with certain limitations in the simulations. The simulation approach to deriving the delays for the grid points can include a variety of techniques for determining how the values should be derived and assigning a confidence level in the delays. The situation is analogous to flipping a fair coin 100 times, getting 47 heads, and deciding that the probability of getting heads is p(H)=0.47. The choice is off by a relatively small amount, but if one attempts to derive the probability of five heads in a row, the errors will accumulate. Since for networks of interest there are quite likely five hops from source to destination, a similar problem arises. It should be noted that the problem of designing for end-to-end delay is additive rather than multiplicative, so that small errors will have less impact.

Figure 8:
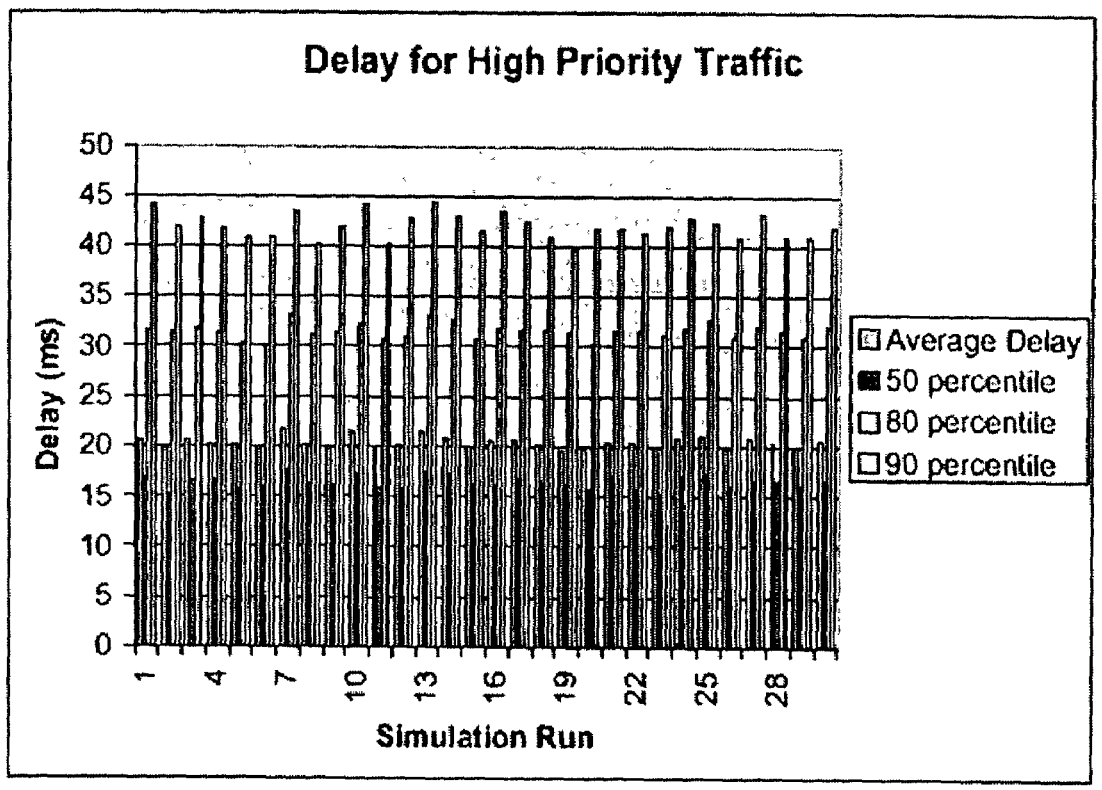
FIG. 8 is a further graphical depiction of simulation results for an exemplary traffic re-assignment in accordance with the present invention.

Looking to the behavior of the simulations, a simple M/M/1 model can be used where $\mu=100$, $\lambda_1=20$ represents the high priority traffic $w_1=0.75$, and $\lambda_2=60$ is low priority with $w_2=0:25$. FIG. 8 shows the behavior of the average delay, 50th percentile delay, 80th percentile delay, and $90^{th}$ percentile delay for the high priority traffic. The results of all the measures are relatively consistent. Looking at the averages and data, shown in Table 15, it appears that the average results will be an acceptable estimate for the delay of the high priority traffic on the link:

TABLE 15

The performance measures for the high priority traffic.

| Measure | Average | Variance |
|---|---|---|
| Average delay | 20.40 ms | 0.20 |
| 50th percentile | 16.35 ms | 0.41 |
| 80th percentile | 31.93 ms | 0.53 |
| 90th percentile | 41.99 ms | 1.49 |

Figure 9:
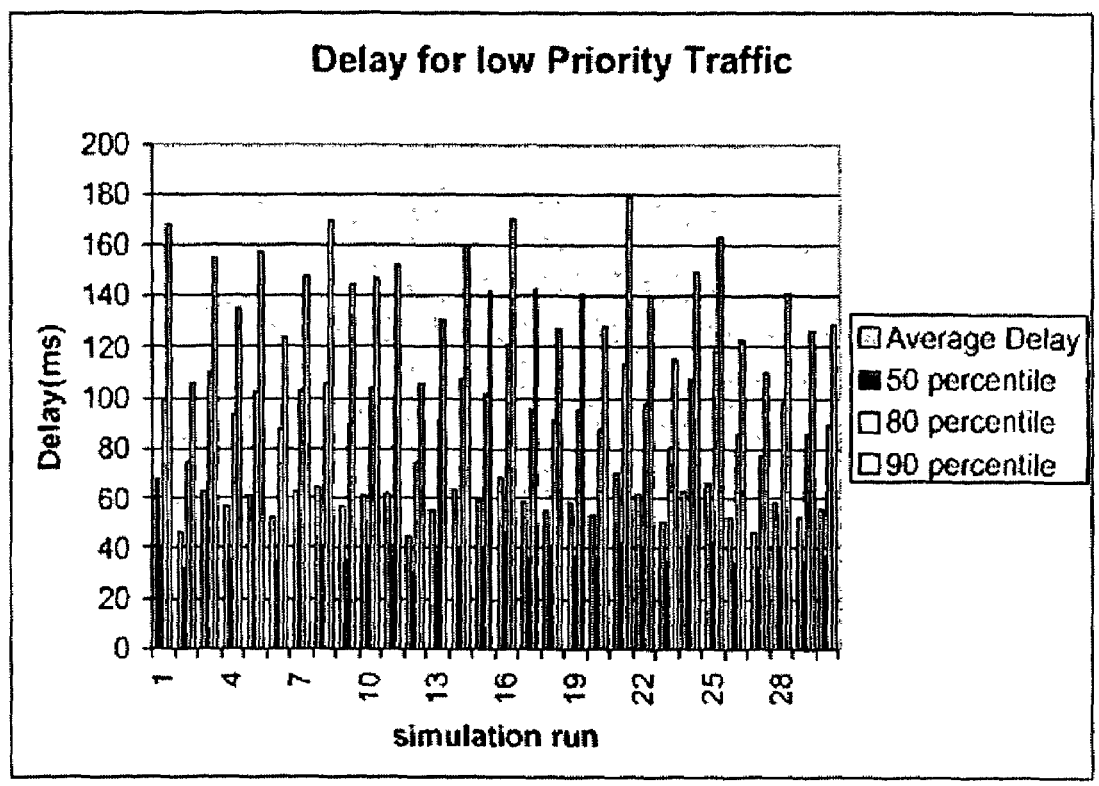
FIG. 9 is another graphical depiction of simulation results for an exemplary traffic re-assignment in accordance with the present invention.

The results, which are shown in FIG. 9, for the low priority traffic are also interesting. It is readily apparent that this data is significantly noisier. The extent of this variation is found in Table 16:

TABLE 16

The performance measures for the low priority traffic.

| Measure | Average | Variance |
|---|---|---|
| Average delay | 58.31 ms | 44.21 |
| 50th percentile | 38.02 ms | 14.76 |
| 80th percentile | 96.43 ms | 145.54 |
| 90th percentile | 141.04 ms | 380.90 |

Thus, it is clear that the average delays may not be a reliable estimate for the delay on the link. First and second approaches to address the lack of reliable estimates for average delay are set forth below.

In the first approach, the lower priority traffic can be better estimated by longer simulation runs. For this approach, it will be appreciated that as the number of classes of service increase, the length of the simulation runs needed for the variation of the estimates to drop below a given number can become significant.

In the second approach, an [(Average_delay)+(n)(standard_deviation)] can be used as an upper bound for the delay of the low priority traffic. In an exemplary embodiment, setting n=2 is reasonable and not overly conservative.

It is understood that the QoS differential may be most apparent as the link utilization level increases. For example, a system may provide three services of 75 ms, 150 ms, and 225 ms end-to-end delays, which translate to link delays of 20, 40, and 60 ms, respectively. Assuming typical engineering rules and limiting the busy-hour utilization of the link to 60%, for weights $w_1=0.7$, $w_2=0.25$, $w_3=0.05$, then a 10% grid of points results in the delays per class shown in Table 17 below. This assumes a M/M/1 model, $\mu=100$ and $\lambda_1+\lambda_2+\lambda_3=60$.

TABLE 17

The average delays for a grid of flows M/M/1 model.

| $\lambda_1$ | $\lambda_2$ | $\lambda_2$ | Delay$_1$ | Delay | Delay$_3$ |
|---|---|---|---|---|---|
| 60 | 0 | 0 | 25 ms | * | * |
| 50 | 10 | 0 | 23.23 ms | 25.77 ms | * |
| 50 | 0 | 10 | 23.22 ms | * | 25.78 ms |
| 40 | 20 | 0 | 21.20 ms | 30.01 ms | * |
| 40 | 10 | 10 | 20.76 ms | 23.36 ms | 34.35 ms |
| 40 | 0 | 20 | 20.00 ms | * | 33.74 ms |
| 30 | 30 | 0 | 19.19 ms | 29.31 ms | * |
| 30 | 20 | 10 | 19.15 ms | 25.86 ms | 32.40 ms |
| 30 | 10 | 20 | 19.06 ms | 21.70 ms | *33.13 ms |
| 30 | 0 | 30 | 18.54 ms | * | 30.54 ms |

From Table 17 it can be seen that at 60% link utilization, the high priority just makes its objective as long as no more than half the traffic is high priority. The low priority traffic achieves significantly better results than is specified in the SLA.

The present invention provides a method for turning SLAs into routings and WFQ settings. An exemplary algorithm assigns traffic to various queueing classes, which is relatively efficient for a universal choice of weights. With this arrangement, networks can be managed for optimization of existing bandwidth instead of merely throwing bandwidth at the problem.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of providing multiple QoS levels in a network, comprising:
    determining a topology of the network including node locations and links that interconnect the nodes;
    determining a number of logical queues for each of the nodes;
    assigning, for each of the queues routing weights for each class of traffic in a plurality of scheduling mechanism classes corresponding to respective priority for the classes of traffic;
    assigning network traffic to the queues on a link-by-link basis;
    determining whether the multiple QoS levels are satisfied;
    re-assigning, if the multiple QoS levels are not satisfied, a portion of the traffic that does not meet a first one of the multiple QoS levels from a first one of the scheduling mechanism classes to a second one of the scheduling mechanism classes which is higher priority than the first one of the scheduling mechanism classes;
    determining whether the traffic re-assignment results in the multiple QoS levels being satisfied; and
    re-assigning the traffic portion using a North East grid point in a plot of first and second arrival rates for respective first and second ones of the queues associated with a first one of the links.

2. A method of providing multiple QoS levels in a network, comprising:
    determining a topology of the network including node locations and links that interconnect the nodes;
    determining a number of logical queues for each of the nodes;

assigning, for each of the queues, routine weights for each class of traffic in a plurality of scheduling mechanism classes corresponding to respective priority for the classes of traffic;

assigning network traffic to the queues on a link-by-link basis;

determining whether the multiple QoS levels are satisfied;

re-assigning, if the multiple QoS levels are not satisfied, a portion of the traffic that does not meet a first one of the multiple QoS levels from a first one of the scheduling mechanism classes to a second one of the scheduling mechanism classes which is higher priority than the first one of the scheduling mechanism classes;

determining whether the traffic re-assignment results in the multiple QoS levels being satisfied; and incrementally increasing one or more Service Level Agreements (SLA) corresponding to the multiple QoS levels based upon a first link delay that most exceeds the given SLA.

3. The method according to claim 2, further including selecting a rough step size to determine an approximate SLA and then a fine step size to further refine the approximate SLA.

4. The method according to claim 2, further including determining a minimal SLA that can be met with existing network bandwidth.

5. The method according to claim 2, further including determining that a proposed SLA cannot be met with existing network bandwidth.

6. A method of assigning traffic in a multiple QoS network, comprising:

assigning network traffic to a lowest Weighted Fair Queueing (WFQ) class of a plurality of WFQ classes;

determining if there are one or more network paths that do not meet an associated Service Level Agreement (SLA);

determining a first one of the network paths that most exceeds its associated SLA;

examining a first link in the first one of the networks paths;

computing a result of moving the traffic associated with the first link to a higher WFQ class;

determining whether the traffic re-assignment causes any other traffic to no longer meet its SLA; and examining a next link in the first one of the network paths if the traffic re-assignment causes any other traffic to no longer meet its SLA.

7. The method according to claim 6, further including modifying WFQ weights associated with the WFQ classes to meet the SLAs.

8. The method according to claim 6, further including determining optimal SLAs for the network paths having existing bandwidth.

9. The method according to claim 6, further including incrementally increasing a first SLA by a predetermined first step size to determine a minimum SLA that can be met with existing bandwidth.

* * * * *